United States Patent
Wolf

(10) Patent No.: US 10,502,911 B2
(45) Date of Patent: Dec. 10, 2019

(54) LASER ARRANGEMENT WITH AUXILIARY RING

(71) Applicant: JENOPTIK Laser GmbH, Jena (DE)

(72) Inventor: Juergen Wolf, Schloeben (DE)

(73) Assignee: JENOPTIK Optical Systems GmbH, Jena (DE)

( * ) Notice: Subject to any disclaimer, the term of this patent is extended or adjusted under 35 U.S.C. 154(b) by 217 days.

(21) Appl. No.: 15/544,723

(22) PCT Filed: Jan. 19, 2016

(86) PCT No.: PCT/EP2016/051021
§ 371 (c)(1),
(2) Date: Jul. 19, 2017

(87) PCT Pub. No.: WO2016/116448
PCT Pub. Date: Jul. 28, 2016

(65) Prior Publication Data
US 2018/0011270 A1    Jan. 11, 2018

(30) Foreign Application Priority Data

Jan. 23, 2015  (DE) .................. 10 2015 000 662

(51) Int. Cl.
| | |
|---|---|
| *G02B 6/42* | (2006.01) |
| *G02B 6/38* | (2006.01) |
| *G02B 6/32* | (2006.01) |
| *G02B 27/00* | (2006.01) |

(52) U.S. Cl.
CPC ............ *G02B 6/4296* (2013.01); *G02B 6/32* (2013.01); *G02B 6/3813* (2013.01); *G02B 6/3814* (2013.01); *G02B 6/4206* (2013.01); *G02B 27/0018* (2013.01)

(58) Field of Classification Search
CPC .. G02B 6/4296; G02B 6/3813; G02B 6/3814; G02B 6/32
See application file for complete search history.

(56) References Cited

U.S. PATENT DOCUMENTS

| | | |
|---|---|---|
| 4,729,621 A | 3/1988 | Edelman |
| 4,732,450 A | 3/1988 | Lee |
| 5,513,201 A | 4/1996 | Yamaguchi et al. |
| 5,619,602 A | 4/1997 | Sandstrom et al. |
| 6,089,741 A | 7/2000 | Chen et al. |
| 6,124,973 A | 9/2000 | Du et al. |
| 6,151,168 A | 11/2000 | Goering et al. |
| 6,347,178 B1 | 2/2002 | Edwards et al. |
| 6,680,800 B1 | 1/2004 | Schreiber et al. |
| 8,843,753 B2 | 9/2014 | Koenning |
| 9,235,053 B2 | 1/2016 | Wolf et al. |

(Continued)

FOREIGN PATENT DOCUMENTS

| | | |
|---|---|---|
| DE | 196 45 150 A1 | 5/1998 |
| DE | 197 80 124 B4 | 2/2007 |

(Continued)

*Primary Examiner* — Sung H Pak
*Assistant Examiner* — Hoang Q Tran
(74) *Attorney, Agent, or Firm* — Muncy, Geissler, Olds & Lowe, P.C.

(57) ABSTRACT

The invention relates to a transparent auxiliary ring for the adjustment, for the long-term stable operation and for protection of fiber-coupled laser arrangements.

13 Claims, 6 Drawing Sheets

(56) References Cited

U.S. PATENT DOCUMENTS

Figure 1:
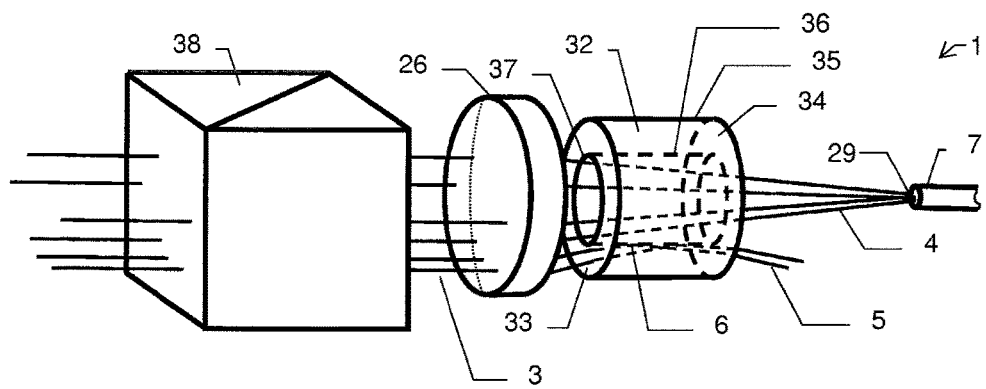

| | | |
|---|---|---|
| 2002/0197020 A1 | 12/2002 | Qian et al. |
| 2003/0012496 A1 | 1/2003 | Yamagata et al. |
| 2003/0095747 A1 | 5/2003 | Tsai et al. |
| 2009/0258053 A1 | 10/2009 | Horvers |
| 2009/0310915 A1 | 12/2009 | Jewell et al. |
| 2010/0072180 A1* | 3/2010 | Schuermann ........ G02B 6/4296 219/121.67 |
| 2010/0158060 A1 | 6/2010 | Faybishenko |
| 2011/0052126 A1 | 3/2011 | Yamamoto et al. |
| 2013/0022060 A1 | 1/2013 | Gaborel et al. |
| 2013/0266031 A1* | 10/2013 | Norton ..................... H01S 3/08 372/9 |

FOREIGN PATENT DOCUMENTS

| | | |
|---|---|---|
| DE | 10 2010 038 572 A1 | 2/2012 |
| DE | 10 2013 006 316 A1 | 10/2014 |
| EP | 0 619 508 A1 | 10/1994 |
| EP | 1 096 285 A2 | 5/2001 |
| EP | 2 056 897 B1 | 12/2009 |
| WO | WO 01/27686 A1 | 4/2001 |
| WO | WO 2012/004381 A2 | 1/2012 |
| WO | WO 2012/098456 A1 | 7/2012 |

\* cited by examiner

LASER ARRANGEMENT WITH AUXILIARY RING

This application is a National Stage of International Application No. PCT/EP2016/051021, filed on Jan. 19, 2016, which claims priority to Application No. DE 102015000662.2 filed in Germany on Jan. 23, 2015, the entire contents of all of which are hereby incorporated by reference.

TECHNICAL FIELD

The invention relates to a device for coupling laser radiation into an optical fiber, and to a method for this purpose and to the use of an auxiliary ring. The invention is applicable in particular to a fiber-coupled diode laser. The invention can advantageously serve as an adjustment aid and increase the operational reliability and long-term stability of the fiber-coupled laser.

PRIOR ART

Numerous arrangements and methods are known which couple radiation from diode lasers into an optical fiber. In order to reduce the known asymmetry of the beam profile, the beam bundles are reshaped and/or rearranged beforehand. Furthermore, the beam bundles of the emitters are collimated and are focused onto the end face of an optical fiber by means of a focus lens. Some of these known arrangements are mentioned below.

US20100158060A1 discloses a laser arrangement for coupling laser light into an optical fiber. What is disadvantageous is that a swamping of the numerical aperture (NA) of the fiber can occur in the case of erroneous adjustment.

U.S. Pat. No. 8,848,753 discloses a device for combining diode laser radiation.

DE19780124 discloses a laser arrangement for coupling laser light into an optical fiber.

WO 2012/004381 discloses a further laser arrangement for coupling laser light into an optical fiber.

DE 102010038572 discloses a further laser arrangement for coupling laser light into an optical fiber.

U.S. Pat. No. 5,513,201 discloses a laser arrangement for symmetrizing laser radiation of a diode laser bar. The diode laser radiation can be coupled into an optical fiber.

US 2011/0052126 A1 discloses a further device for coupling laser radiation into an optical fiber.

US 2009/0310915 A1 discloses a further device for coupling laser radiation into an optical fiber.

US 2003/0012496 A1 discloses a further device for coupling laser radiation into an optical fiber.

However, the last three devices mentioned are also unable to provide such an advantageous adjustment aid which allows the optimum adjustment state to be found rapidly by means of a simple power measurement. Moreover, these devices cannot reliably prevent the erosion of the fiber in the case of a sub-optimum adjustment state.

DE 102013006316 A1 discloses a device for symmetrizing diode laser radiation. Such an arrangement can provide a collimated laser beam bundle and can be used as a laser beam source in the context of the present invention.

WO01/27686A1 discloses a laser arrangement for coupling laser light into an optical fiber, which laser arrangement comprises one or a plurality of first laser light sources and can additionally comprise one or a plurality of second laser light sources. Furthermore, coupling means are provided, which couple the laser light of the first and second laser light sources to one another before entrance into the fiber. A phase retardation plate is assigned to one of the groups, and a polarization coupling device is provided, which couples the emitted light of the first and second groups to one another. For this purpose, a polarization-selective mirror element is provided here, which deflects the light of only one polarization direction. This makes it possible to couple the light of both groups to one another by means of polarization coupling. Although this is a laser arrangement virtually free of astigmatism, there is the disadvantage that the numerical aperture of the fiber can be swamped in particular during adjustment, but under certain circumstances also during operation of the laser arrangement. As a result, undesired light can pass into the cladding of the fiber and damage the fiber. Moreover, it is difficult to exactly superimpose the collimated beam paths of both groups of lasers.

In EP2056897, a stop is additionally added to the laser arrangement cited last, said stop being suitable for a spatial delimitation of the emitted laser light before coupling into the fiber. Although the function of the stop is not indicated in more specific detail, it will be an aperture stop which could contribute to eliminating astigmatic imaging aberrations. The stop could also be used to shade the marginal regions of the collimated beam upstream of the focus lens, such that the numerical aperture of the fiber is not swamped. This would likewise be able to rectify the problem that undesired light could pass into the fiber cladding. However, the stop can become hot in particular during adjustment but also during operation of the laser arrangement. In order to avoid overheating, the stop has to be cooled, which is very complex. Moreover, part of the shaded laser light can be reflected at the stop and returned to the laser light source. Damage to the laser light source can occur as a result.

DE19645150A1 discloses rearrangement of the beam bundles of a plurality of linear laser beam sources arranged in a series such that they can be stacked one above another and coupled into an optical fiber.

WO 2012098456A1 discloses an arrangement in which a beam bundle is coupled into an optical fiber. The fiber end is arranged in a transparent ferrule, which also serves to couple non-usable light out of the fiber. However, that does not work if the numerical aperture of the fiber is chosen to be greater than the specified numerical aperture of the laser radiation.

US2003/0095747 discloses arranging an optical fiber with a ferrule together with a GRIN lens in a small glass tube.

US20020197020 discloses arranging a fiber ferrule jointly in a small glass tube, at the end surface of which a focus lens is arranged. The inner diameter of the small glass tube corresponds to the effective aperture, i.e. to the lens diameter minus the lens edge. What is disadvantageous is that stringent requirements have to be made in respect of the manufacturing tolerances of the inner and outer diameters of the small glass tube. Therefore, the small glass tube is costly to produce. Moreover, the fiber ferrule is adhesively bonded into the small glass tube. Therefore, waste heat cannot be adequately dissipated from the fiber ferrule. Moreover, non-useful radiation can pass into the adhesive joint between the fiber ferrule and the small glass tube and lead to local overheating there. Moreover, the angle and the position of the fiber axis with respect to the optical axis of the focus lens cannot be adjusted. In the case of a beveled coupling-in face of the optical fiber, a glass wedge is required in order to provide the correct angle of incidence.

Problem Addressed by the Invention

The problem addressed by the invention is to provide a device for coupling laser radiation into an optical fiber which easily prevents the numerical aperture of the laser radiation from being exceeded at the entrance end of the optical fiber. This is intended to prevent damage to the laser and/or the optical fiber during adjustment. Moreover, safety during operation of the laser is intended to be increased. Equally, an adjustment of the focus lens with respect to the fiber is intended to be possible.

Moreover, the intention is to provide a method for the stated purpose, and to specify the use of a light-guiding auxiliary ring for that very purpose.

Solution to the Problem

The problem is solved by means of a device for coupling laser radiation into an optical fiber, wherein the optical fiber has a coupling-in end having a fiber end face, comprising a laser beam source which provides a collimated beam bundle, and a focus lens, which has an effective aperture D, a focal length f, an optical axis and a fiber-side lens surface, wherein the focus lens focuses the collimated beam bundle in the direction of the fiber end face into a focus. The device according to the invention is characterized in that a transparent auxiliary ring having a ring inner diameter $d_R$ and a length $l_R$ is provided, wherein the auxiliary ring has an inner lateral surface, an outer lateral surface, a first end surface and a second end surface, wherein the auxiliary ring is arranged in the beam path downstream of the focus lens, and the inner lateral surface is centered with respect to the optical axis, the first end surface is arranged in a first plane situated at a distance s upstream of the focus, and the ring inner diameter $d_R$ is less than D·s/f and the length $l_R$ of the auxiliary ring is less than the distance s.

To solve the problem, a transparent auxiliary ring according to claim 12 is used as a key component. The solution to the problem additionally comprises a method according to claim 13.

Advantages of the Invention

In particular, the invention is applicable to a fiber-coupled diode laser. The invention can advantageously serve as an adjustment aid. The optimum adjustment state can be set on the basis of a simple power measurement at the fiber end. Fiber erosion cannot occur in the case of a temporary sub-optimum adjustment state. Moreover, in the case of polarization- or wavelength-coupled lasers, the beam paths of the individual polarization directions or wavelengths can be aligned exactly with respect to one another in a simple manner.

Moreover, the numerical aperture of the laser radiation is prevented from increasing in the case of a subsequent alteration of the adjustment state of the device or of the laser beam sources. As a result, the optical fiber and fiber combiners possibly arranged downstream are better protected against erosion. Consequently, it is possible to increase for example the operational reliability and long-term stability of a fiber-coupled laser, in particular of a diode laser.

The auxiliary ring according to the invention makes less stringent requirements in respect of cooling than a stop. Therefore, the invention is advantageous in comparison with known arrangements in which the stated problem is attempted or might be attempted to be solved with a stop.

DESCRIPTION

The device according to the invention serves for coupling laser radiation into an optical fiber.

The optical fiber can have a fiber core and a fiber cladding. The fiber core can particularly preferably have a round cross section. However, it can also have an oval, rectangular or polygonal cross section. The fiber core can have for example a diameter of between 20 μm and 1000 μm. The fiber cladding can have a lower refractive index than the fiber core. As a result, the fiber can guide light. The fiber can be embodied for example as a stepped-index fiber or as a graded-index fiber. Moreover, the fiber can have a protective coating on its exterior. The optical fiber can be a multimode fiber, that is to say that it can guide a plurality of laser modes. The optical fiber has a coupling-in end having a fiber end face. Said end face can be provided for coupling in the laser radiation. The fiber end face can be a planar face. The fiber end face can be arranged perpendicular to the fiber axis. However, it can also be at an angle with respect to the fiber axis that is between 70° and 90°, for example, in order for example to avoid harmful back-reflections of laser radiation in a known manner. The fiber end face can have an antireflection coating. The fiber end can, but need not, have a fiber end cap, which can be embodied as a transparent glass body. The fiber end cap can be welded onto the fiber. In this case, the fiber end face should be considered to be the end face of the fiber end cap, which end face can advantageously be larger than the cross section of the fiber core. Through the fiber end cap, the laser radiation can be coupled into the fiber over a larger area and it is thus possible to reduce the power density on the fiber end face in comparison with a coupling-in end without a fiber end cap.

A laser beam source is provided for generating the laser radiation, said laser beam source providing a collimated beam bundle. The laser beam source can be multimode. It can have a beam quality factor $M^2$ of between 2 and 100, for example. The laser beam source can comprise a diode laser element, which can be embodied for example as an edge emitting emitter. The emitters can be embodied as broad stripe emitters. Preferably, the laser beam source can have a plurality of emitters. In this case, the plurality of emitters can each be embodied as an individual emitter. However, it is also possible to provide one or a plurality of diode laser elements each having a plurality of emitters, which can be embodied for example as laser bars. The beam profile of such diode laser elements can be asymmetrical. In order to be able to couple the radiation thereafter into the optical fiber, a symmetrization and/or a rearrangement of the beam bundles of the emitters can be provided.

Moreover, one or a plurality of optical elements for collimating the laser radiation can be provided. By way of example, an FAC lens for collimating the fast axis of the laser radiation can be provided. Furthermore, an SAC lens or an SAC lens array for collimating the slow axis of the laser radiation can be provided. The use of separate elements for collimating the fast axis and respectively the slow axis can be advantageous if the divergences of the laser radiation of the emitters with respect to the slow and fast axes are different. By means of the collimation elements mentioned, the laser beam source can provide a collimated beam bundle. Moreover, beam rotating elements can be provided, which to rotate for example individual beam bundles about an axis pointing in the direction of propagation. Such elements are known for example from U.S. Pat. No. 5,513,201. They can bring about a symmetrization of the beam bundles. Moreover, stepped mirrors or staircase mirrors can be provided in order to geometrically stack the beam bundles of a plurality of emitters one above another. Such mirrors are known for example from DE19780124, U.S. Pat. No. 5,513,194, DE102010038572 and DE19780124. As a result, the beam bundles can be rearranged such that simple coupling into the fiber becomes possible. Moreover, a plurality of (individual) beam bundles of a plurality of individual emitters can be combined to form a (common) beam bundle of the laser beam source. The totality of the optical elements for collimation and for beam rearrangement can be referred to as a collimation device.

A laser beam source that provides a collimated beam bundle can be produced in a known manner in one of the ways mentioned above. In this case, the collimated beam bundle of the laser beam source can consist of a plurality of beam bundles of individual emitters. The largest possible portion of the collimated beam bundle is intended to be coupled into the optical fiber. This proportion of the beam bundle that is to be coupled in constitutes the useful radiation. A portion of the available laser radiation can be discarded in the marginal region of the collimated beam bundle. It may be desired not to focus this portion of the beam bundle onto the fiber end face, but rather to direct it away from the fiber end face. This portion of the beam bundle is referred to as non-useful radiation. This is therefore the radiation to be discarded. The reason for discarding portions of the available laser radiation may be that the non-useful radiation has an undesirably high numerical aperture NA, and/or that it is afflicted with imaging aberrations. An attempt to couple this radiation into the fiber could lead to the destruction of the fiber. Therefore, it can be advantageous to deflect the non-useful radiation beforehand according to the invention. The possibility of deflecting non-useful radiation can increase the operational reliability of the laser. The laser can then continue to be operated even in a misaligned state, without a jeopardization of downstream optical elements being able to occur. The deflected non-useful radiation can be absorbed by a separate element, for example a housing wall. If the non-useful radiation can leave the auxiliary ring, that can have the advantage that hardly any waste heat arises in the auxiliary ring itself.

Furthermore, a focus lens is provided, which focuses the collimated beam bundle in the direction of the fiber end face into a focus. The focus is the fiber-side focal point of the focus lens. At the focus, a focal plane can be defined perpendicular to the optical axis. In this case, the focus can lie on the fiber end face. Particularly if the fiber end has an end cap, it can be advantageous if the focus does not lie on the fiber end face, but rather in the end cap at the location at that location at which the end cap is connected to the fiber core. The focus lens can advantageously be embodied in a rotationally symmetrical fashion. It can be embodied as a spherical lens or as an aspherical lens. It can also consist of a plurality of lenses and be embodied for example as an achromatic lens. The outer contour of the focus lens can advantageously be embodied in a circular fashion in a projection in the direction of the optical axis, but it can also be embodied in a rectangular fashion, for example.

The focus lens can have an effective aperture D and a focal length f. The focus lens can have an optically functional region of the lens surface, i.e. a region which is suitable for focusing the radiation. Furthermore, a region that is not optically functional can be present, for example a lens edge. The focal length f is known as a characteristic variable of a lens. The effective aperture can correspond to the diameter of the entrance pupil of the focus lens. The effective aperture D can be the product of the aperture ration o of the focus lens and the focal length f. As a value for the effective aperture it is also possible to use, for example, twice the maximum distance between an incident parallel beam and the optical axis which could be diffracted by the focus lens onto the focus if the auxiliary ring were imagined not to be there. This value can be used as effective aperture for the following considerations if, as for example in the case of a rectangular outer contour of the focus lens, no diameter of the entrance pupil can be specified.

Furthermore, the focus lens has an optical axis. That can be the axis of symmetry in the case of a rotationally symmetrical lens. Furthermore, the focus lens has a fiber-side lens surface. That is the lens surface facing the optical fiber.

The device according to the invention has a beam path. The beam path is the geometrical course of the laser beams in the device. With regard to the beam path it should be noted that the beams need not lie exactly in a meridional plane; the principle according to the invention also functions in the general case. The beams can, but need not necessarily, lie exactly in a common plane with the optical axis. In the geometrical sense, beams can to a certain degree be situated skew with respect to the optical axis. That can be caused, for example, by the fact that a multimode laser beam source is used and/or by the fact that the optical elements for collimation and/or for beam rearrangement have imaging aberrations and/or are not ideally adjusted. For this reason, it is possible to use a multimode fiber for coupling in the useful radiation which has a fiber core diameter adapted to the real beam waist at the focus, which real beam waist, in accordance with the present beam quality factor $M^2$, is greater than the ideal beam waist of a Gaussian beam.

Furthermore, a transparent auxiliary ring having a ring inner diameter $d_R$ and a length $l_R$ is provided. The auxiliary ring can be embodied as a hollow cylinder. It can consist for example of quartz glass, borosilicate glass, a low-alkali glass or some other glass or a transparent plastic, for example PMMA, polycarbonate, etc. It can have a refractive index $n_R$. Instead of "transparent" it is also possible to use the term "see-through". It can be advantageous to use a material having the lowest possible absorption for the laser radiation.

The auxiliary ring can have an inner lateral surface, an outer lateral surface, a first end surface and a second end surface. The inner lateral surface and the first end surface can have a common edge, referred to hereinafter as inner edge. The auxiliary ring can have a wall thickness w. The wall thickness w can be uniform. The end surfaces can be embodied as annuli. The second end surface can be embodied with the same size as the first.

The auxiliary ring can be arranged in the beam path downstream of the focus lens. That is to say that a ray that impinges on the auxiliary ring has previously passed through the focus lens. The first end surface can be arranged perpendicular to the optical axis of the focus lens. The auxiliary ring can be arranged at a distance a from the focus lens. However, it can be advantageous if no such distance a is present, rather the ring is directly connected to the focus lens. The first end surface can be arranged in a first plane situated at a first distance s upstream of the focus. The distance s can be measured on the optical axis. Said first plane can be situated in the beam path upstream of the focus with regard to the beam direction. The distance s can be less than the focal length f and greater than 0. The ring inner diameter $d_R$ can be less than the effective aperture multiplied by the ratio of the distance s to the focal length f, D·s/f, such that $$d_R < D \cdot \frac{s}{f}$$

holds true. As a result, an axially parallel ray incident on the focus lens at a sufficiently large distance from the optical axis can impinge on the first end surface after diffraction at the focus lens. The ring inner diameter $d_R$ can be less than the effective aperture D of the focus lens. The length $l_R$ of the auxiliary ring can be less than the distance s. That means that the second end surface can be arranged in a second plane, likewise situated upstream of the focus. The auxiliary ring can thus be arranged in the beam path completely upstream of the focal plane. The inner lateral surface can be centered with respect to the optical axis of the focus lens. It is also possible for the inner edge to be centered with respect to the optical axis. The inner lateral surface can advantageously be embodied as a lateral surface of a circular cylinder. The inner edge can be circular.

The auxiliary ring can be suitable for reflecting rays coming from the focus lens, said rays being coupled into the auxiliary ring at the first end surface, at the inner lateral surface by means of total internal reflection. Total internal reflection should be understood to mean reflection of laser beams which are situated in the optically denser medium, that is to say in the auxiliary ring, and impinge on the interface with the optically less dense medium, that is to say on the inner lateral surface, and are reflected internally in the denser medium, the angle of incidence being greater than the critical angle of total internal reflection. The auxiliary ring can surround for example an air-filled cavity having a refractive index of close to 1, while the ring itself can have for example a refractive index of between 1.4 and 2. Total internal reflection in the optically denser medium is thus meant. The inner lateral surface can be embodied in an optically smooth fashion. That can mean that the surface roughness is significantly smaller than the wavelength of the laser radiation. Provision can be made for rays from the marginal region of the beam bundle regularly to impinge on the first end surface during operation of the device. However, it may also be the case that the device is designed such that no rays normally impinge on the first end surface during operation. However, in other operating states, for example during adjustment or if distortion of optical elements occurs and the device nevertheless continues to be operated, impingement of laser beams on the first lateral surface can occur. For this case, the abovementioned suitability of the auxiliary ring is required according to the invention. If the auxiliary ring is arranged in the beam path downstream of the focus lens, rays that impinge on the first end surface can have a direction component toward the optical axis. Therefore, they can impinge on the inner lateral surface, at which they can be reflected on account of total internal reflection.

The rays reflected at the inner lateral surface, after reflection, can propagate further in the auxiliary ring as far as the second end surface. The auxiliary ring can advantageously be embodied such that each individual ray experiences only a single reflection at the inner lateral surface. The reflected rays can arrive at the second end surface with a direction component away from the optical axis. At the second end surface, the rays can preferably emerge again from the auxiliary ring, wherein a refraction can take place at this surface as interface. It is likewise possible, albeit less advantageous, that the rays can also impinge on the outer lateral surface and again be reflected, absorbed or scattered there.

It can be advantageous to reduce a Fresnel reflection of laser beams at the first end surface. That can be realized in various ways. The first end surface can bear directly on the fiber-side lens surface. That can be advantageous, in particular, if the first end surface and the fiber-side lens surface are embodied as planar surfaces. The first end surface can be connected to the fiber-side lens surface by wringing.

The first end surface can be optically connected to the fiber-side lens surface via a transparent coupling material. That can even be possible if the fiber-side lens surface is not a planar surface. A wedge-shaped layer of coupling material can then be present. The Fresnel reflection can likewise be reduced by means of a coupling material. A material index-matched to the auxiliary ring and/or the focus lens (index matching material) is preferably taken into consideration as transparent coupling material. A commercially available gel (index matching gel) having a specific refractive index can be used. However, it can also be advantageous to use a curable optically transparent adhesive as coupling material. It is thereby possible simultaneously to produce a mechanically fixed connection of the auxiliary ring to the focus lens. By way of example, as optical adhesives it is possible to use commercially available epoxy resin or acrylate adhesives or inorganic joining agents for example on the basis of silicate or water glass.

Such a coupling material between the fiber-side lens surface and the first end surface can have yet another advantage. In order to couple rays into the first end surface, it would have to be assumed, in principle, that said surface is optically smooth, that is to say that the roughness is significantly smaller than the wavelength of the laser radiation. If the coupling material described is then used, rays can be coupled into the first end surface even if the latter is rough or unpolished. If the coupling material has a refractive index close to that of the material of the auxiliary ring, a virtually perfect optical coupling to the focus lens can nevertheless be effected. A costly polishing of the first end side can therefore be dispensed with.

The useful radiation, by contrast, can propagate from the fiber-side focus lens surface in the cavity surrounding the auxiliary ring and can be focused onto the fiber.

Advantageously, the device can comprise a focus lens holder. The focus lens can be better adjusted as a result. The auxiliary ring can be connected to the focus lens holder via the first end surface and/or the outer lateral surface. An adhesive connection can be used as the connection. In this case, it can suffice if partial areas of the end surface and/or outer lateral surface are wetted with an adhesive.

The device can be embodied as a polarization-coupled laser module. The beam bundle of the laser beam source can be linearly polarized in a first polarization direction. The device can additionally comprise a second laser beam source, which provides a second collimated beam bundle, which is linearly polarized in a second polarization direction. The second polarization direction can be perpendicular to the first. By way of example, two identically constructed laser beam sources can be used. The polarization direction of the radiation of one of the sources can then be rotated by means of a phase retardation element (e.g. lambda/2 plate) or by means of a mirror arrangement known from WO01/27686A1. The second laser beam bundle can be combined with the first beam bundle by means of a beam splitter, such that the second beam bundle is coupled as it were with the first beam bundle into the optical fiber. To that end, the beam splitter is embodied such that it reflects one polarization direction of the light (preferably s-polarization), while it reflects another polarization direction (preferably p-polarization). Advantageously, the beam splitter can be arranged in the beam path upstream of the first end surface, particularly advantageously in the collimated beam path upstream of the focus lens. It should be noted that the polarization beam splitter in the context of the present invention cannot be used for splitting, but rather for combining the beam bundles. It can thus be operated inversely here, i.e. as a beam combiner.

The device can comprise the coupling of beam bundles of different wavelengths. The beam bundle of the laser beam source can have a first wavelength. The device can additionally comprise a third laser beam source, which provides a third collimated beam bundle, which has a third wavelength different than the first wavelength. The third laser beam bundle can be combined with the first beam bundle by means of a dichroic element, such that the third beam bundle is coupled as it were with the first beam bundle into the optical fiber. The dichroic element can be arranged in the beam path upstream of the first end surface, particularly preferably upstream of the focus lens.

The device can have a housing, and the coupling-in end of the optical fiber can be mechanically connected to the housing. The focus lens can be adjustable relative to the fiber end face. That can be realized for example by the focus lens being arranged in a focus lens holder that is displaceable during adjustment. After adjustment, the focus lens holder can be fixed for example on the housing base.

The optical fiber can have a first numerical aperture $NA_F$. That is the numerical aperture which the light in the fiber is permitted to have at most in order to be guided in the fiber core. This value is usually specified in commercially available optical fibers. The laser radiation can have a second numerical aperture $NA_L$. The second numerical aperture $NA_L$ can be less than the first numerical aperture $NA_F$. By way of example, the first numerical aperture of the fiber can be 0.22, while the laser radiation to be coupled into the fiber has a second numerical aperture of 0.15. The second numerical aperture can be maintained during the transport of the light through the fiber. That can be advantageous since the first numerical aperture of the fiber can be produced only with a specific tolerance. If the second numerical aperture is chosen to be less than the first, the useful light can be made available independently of the tolerance of the fiber.

The wall thickness w of the auxiliary ring can advantageously be chosen with a magnitude such that the rays reflected at the inner lateral surface do not reach the outer lateral surface, but rather pass directly to the second end surface after reflection. The wall thickness can advantageously be greater than one tenth of the ring inner diameter $d_R$.

The outer lateral surface and/or the second end surface can be embodied as optically smooth surfaces. However, it is also possible for the outer lateral surface and/or the second end surface to be embodied and/or coated as light-scattering and/or absorbing surfaces. The surfaces can be embodied in an unpolished fashion for this purpose.

It can be advantageous to choose the length of the auxiliary ring with a magnitude at least such that the rays coupled into the auxiliary ring on the first end surface experience total internal reflection at the inner lateral surface before they impinge on the second end surface. This minimum length can easily be ascertained using conventional Raytracing programs. The preferred minimum length can easily be derived analytically for the case of a planoconvex focus lens, wherein the plane side is the fiber-side lens surface and the first end surface is directly connected to this surface, under the paraxial approximation. In this case, the preferred minimum length $l_R$ of the auxiliary ring results according to the following inequality:

$$l_R > \left(1 - \frac{R_1}{R_2}\right) \cdot s \cdot n_R,$$

wherein $n_R$ is the refractive index of the auxiliary ring. $R_1$ is the maximum distance between the useful radiation and the optical axis of the focus lens, i.e. the radius of the circumcircle of the useful radiation or, to put it another way, the distance between a marginal ray of the useful radiation incident on the focus lens and the optical axis. Said marginal ray of the useful beam portion can intersect the internal edge of the auxiliary ring. $R_2$ is the maximum distance between rays of the collimated beam bundle, which can also still contain non-useful radiation, and the optical axis of the focus lens. The distance between the first plane and the focus, which distance was introduced further above, is designated by s. In practice, it can be advantageous to choose the length of the auxiliary ring to be greater than one tenth of the focal length f of the focus lens, particularly advantageously greater than one quarter. The effective aperture D of the focus lens can, of course, advantageously be chosen to be greater than $2 R_2$, in order that the entire beam bundle can pass through the focus lens. The condition that a marginal ray of the useful beam bundle intersects the internal edge can yield the condition $$d_R = 2 \cdot R_1 \cdot \frac{s}{f}.$$

The required inner diameter of the auxiliary ring can be calculated therefrom. This can yield the numerical aperture of the useful radiation $$NA_L = \frac{d_R}{\sqrt{d_R^2 + 4s^2}}.$$

Conversely, it is possible, of course, to calculate from a predefined numerical aperture $NA_L$ of the useful radiation the required inner diameter $d_R$ of the auxiliary ring and in turn $R_1$ therefrom. The distance s can advantageously be chosen such that the first end surface of the auxiliary ring touches the fiber-side lens surface of the focus lens, which can constitute a maximum distance $s_{max}$.

The wall thickness w of the auxiliary ring should can preferably be at least $$w > (R_2 - R_1) \cdot \frac{s}{f}$$

in order that the non-useful radiation can impinge completely on the first end surface.

On the other hand, it can be advantageous for the length $l_R$ of the auxiliary ring not to be chosen to be unnecessarily long. This makes it possible to prevent reflected non-useful rays from impinging on the outer lateral surface of the auxiliary ring from the inside. Specifically, if rays impinged on the outer lateral surface, that could have the effect that the rays would be reflected again toward the optical axis. The deflection of the non-useful radiation could be impaired as a result. An inequality can likewise easily be derived for the case of a planoconvex focus lens, wherein the plane side is the fiber-side lens surface and the first end surface is directly connected to said surface, under the paraxial approximation. A preferred maximum length of the auxiliary ring $l_R$ or a further condition for the preferred minimum wall thickness w is obtained according to the following inequality:

$$l_R < \frac{w \cdot f \cdot n_R}{R_1}.$$

Moreover, the length of the auxiliary ring should be less than the distance s defined above. In the general case, a numerical calculation using a Raytracing program is recommended here, too.

At this juncture a dimensioning example shall also be specified, in which the auxiliary ring is directly attached to a planoconvex focus lens having a refractive index of 1.5. By way of example, the ring inner diameter $d_R$=8.5 mm and the distance s=28 mm can be chosen, while the focal length of the focus lens can be f=33 mm. The distance s can arise by virtue of the auxiliary ring being placed by its first end surface directly onto the fiber-side plane lens surface of the focus lens, wherein, on account of the thickness of the lens, the distance s is less than the focal length f. For this dimensioning example, a second numerical aperture $NA_L$=0.15 is obtained for the laser radiation. In this example, the useful beam bundle can have a circumcircle having the radius $R_1$=5.0 mm upon impinging on the focus lens. If, during adjustment, the collimated beam bundle can then deviate for example by one millimeter from the optimum position with respect to the optical axis, then the maximum distance between rays of the collimated beam bundle and the optical axis can be fixed at $R_2$=6 mm. The effective aperture of the focus lens should then be at least 12 mm; by way of example, a lens having an aperture width of 12.5 mm can be used. If an auxiliary ring having a refractive index of $n_R$=1.5 is then used, a minimum length of the auxiliary ring of 7 mm can be recommended. The ring can actually be embodied with a length of 10 mm, for example. It should then have a wall thickness of at least 1 mm. The wall thickness w can be chosen to be 2 mm thick, for example. The outer diameter of the auxiliary ring can then be 12.5 mm.

What is advantageous according to the invention is the use of a transparent auxiliary ring having a ring inner diameter $d_R$ and a length $l_R$, which auxiliary ring has an inner lateral surface, an outer lateral surface, a first end surface and a second end surface and is suitable for reflecting non-useful light, coupled in at the first end surface, at the inner lateral surface by means of total internal reflection and for coupling out and/or scattering and/or absorbing said light at the second end surface and/or the outer lateral surface, for adjusting and/or for operating and/or for protecting a device for coupling laser radiation into an optical fiber, wherein the device comprises a focus lens having an effective aperture D and a focal length f, wherein the focus lens focuses the laser radiation in the direction of the fiber end face into a focus, wherein
the first end surface is arranged in a first plane situated at a distance s upstream of the focus, and
the ring inner diameter $d_R$ is less than D·s/f, and
the inner lateral surface is centered with respect to the optical axis, and
the length $l_R$ of the auxiliary ring is less than the distance s.

The auxiliary ring can be produced from a glass tube for example by cutting to length. Cutting to length can be carried out for example by scribing and breaking or by sawing to size or by means of laser processing.

What is furthermore specified is a method for coupling laser radiation into an optical fiber, wherein the optical fiber has a coupling-in end having a fiber end face, comprising
a) providing at least one collimated beam bundle,
b) focusing the collimated beam bundle into a focus by means of a focus lens,
c) coupling the focused beam bundle into the optical fiber, wherein the focus lens has an effective aperture D, a focal length f, an optical axis and a fiber-side lens surface, characterized in that a transparent auxiliary ring having a ring inner diameter $d_R$ and a length $l_R$ is provided, wherein the auxiliary ring has an inner lateral surface, an outer lateral surface, a first end surface and a second end surface, wherein the auxiliary ring is arranged in the beam path downstream of the focus lens, and
the first end surface is arranged in a first plane situated at a distance s upstream of the focus, and
the ring inner diameter $d_R$ is less than D·s/f, and the inner lateral surface is centered with respect to the optical axis, and
the length $l_R$ of the auxiliary ring is less than the distance s.

In the method according to the invention, the auxiliary ring can be suitable for reflecting rays, coupled in at the first end surface, at the inner lateral surface by means of total internal reflection and for coupling out and/or scattering and/or absorbing said rays at the second end surface and/or the outer lateral surface.

Figure 2:
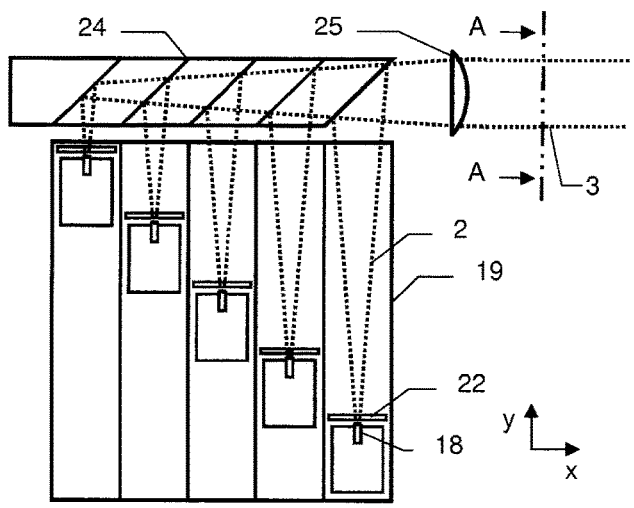
Figure 3:
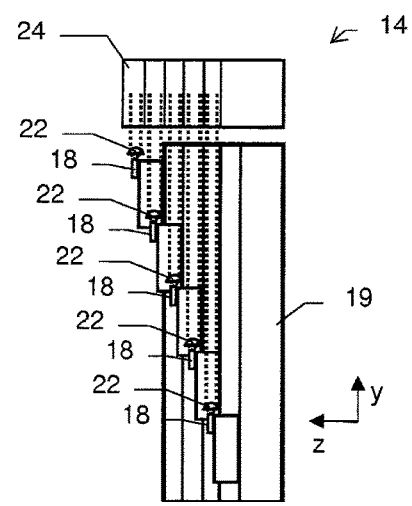
Figure 4:
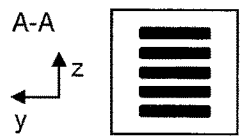
Figures 5, 6:
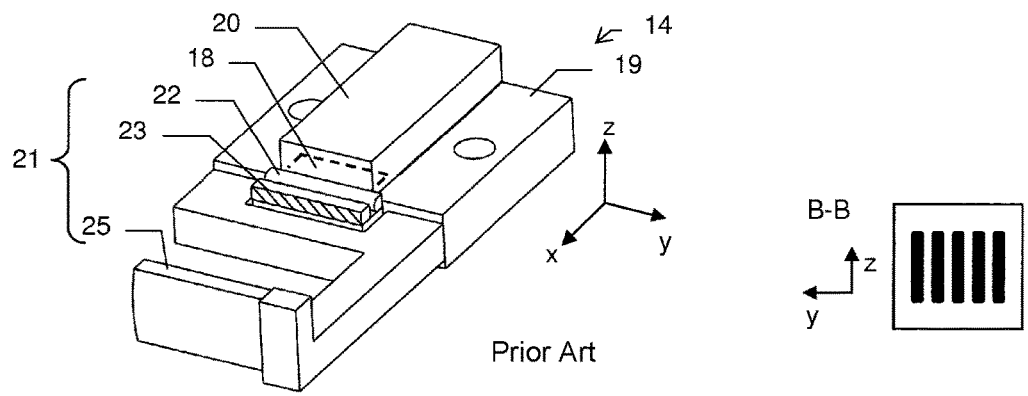
Figure 7:
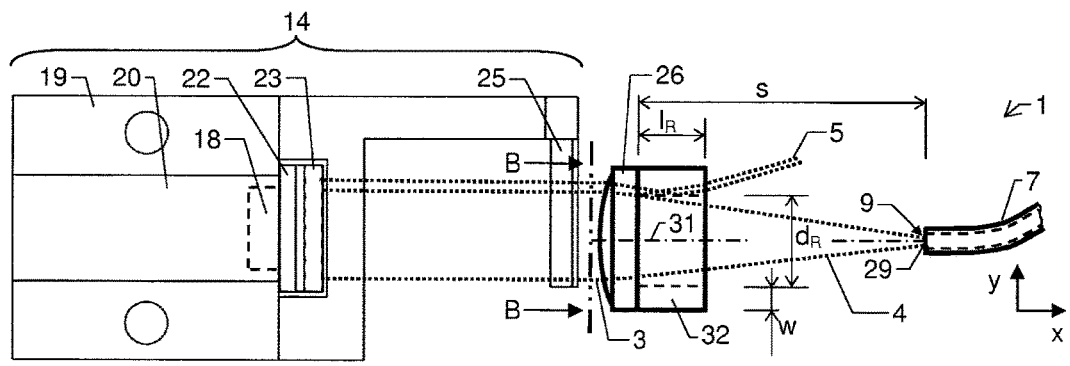
Figure 8:
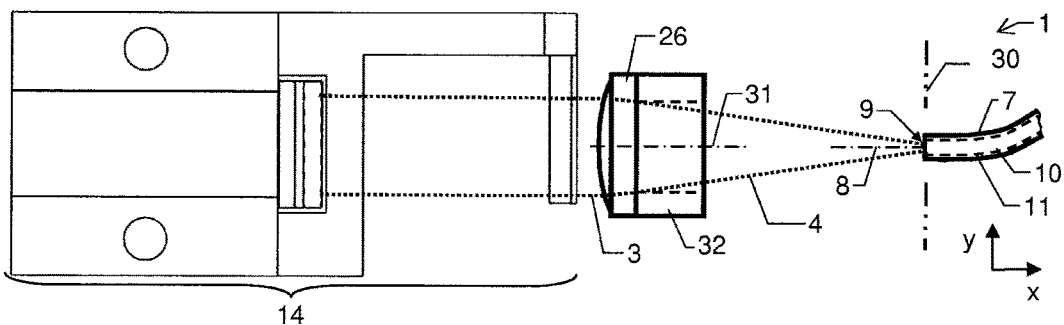
Figure 9:
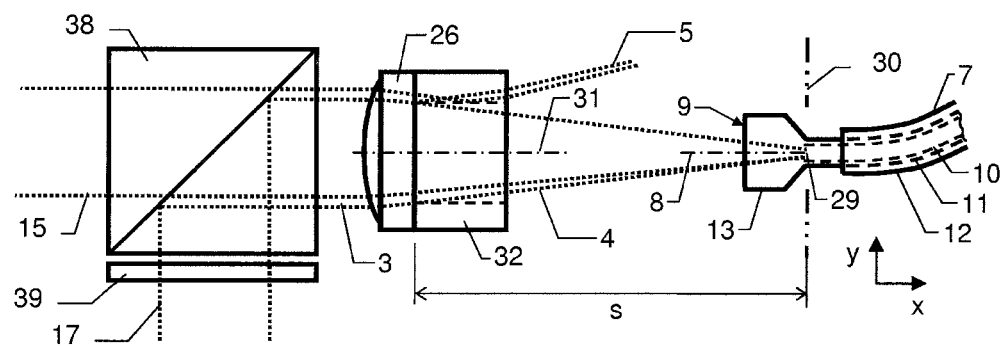
Figure 10:
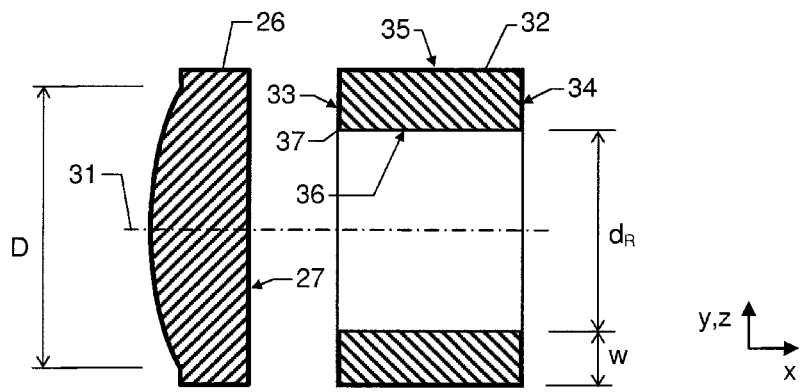
Figure 11:
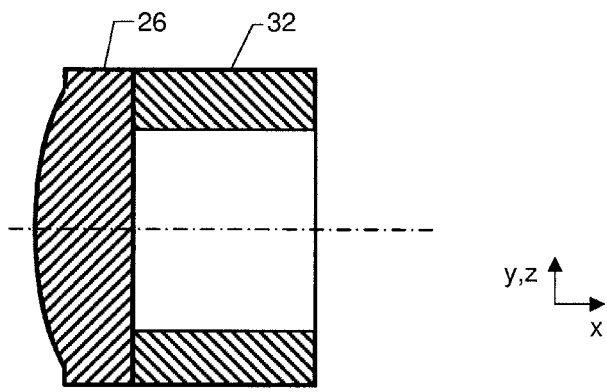
Figure 12:
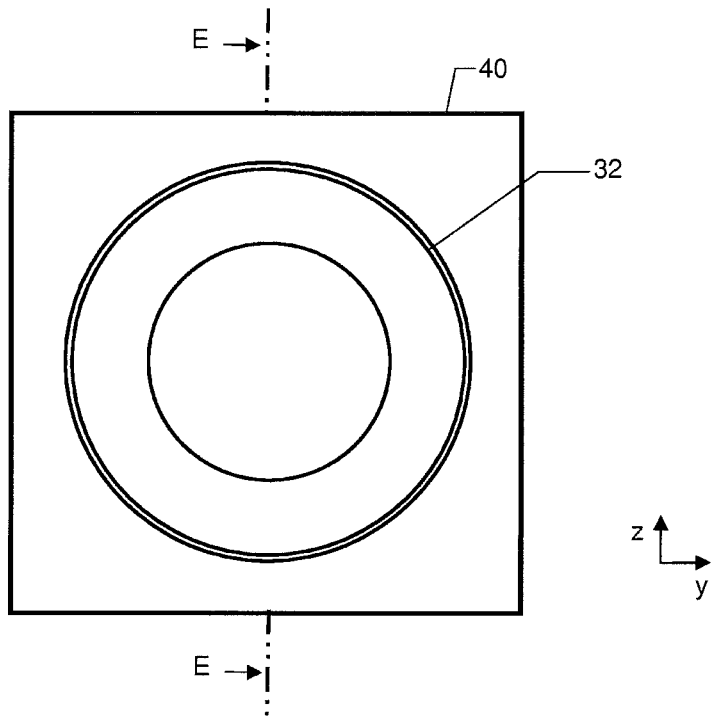
Figure 13:
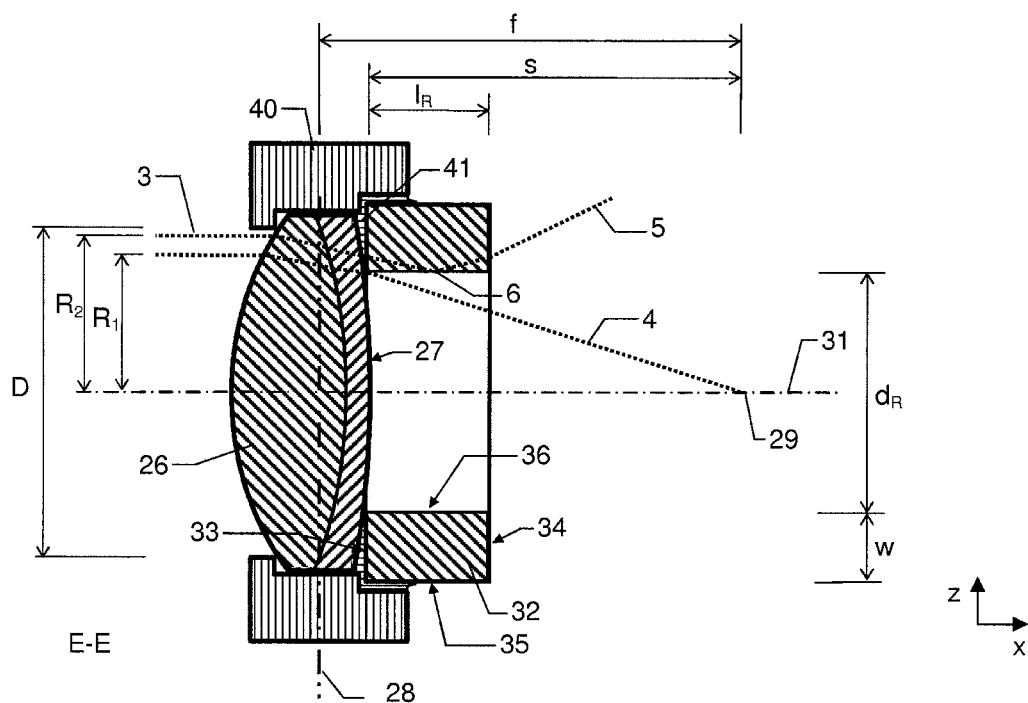
Figure 14:
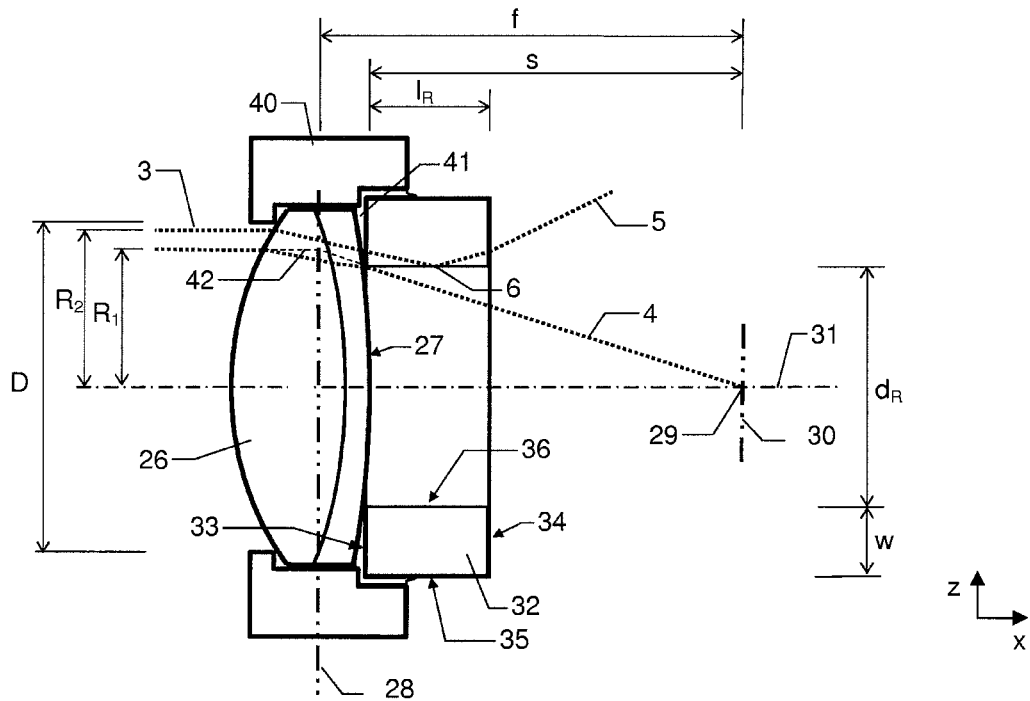
Figure 15:
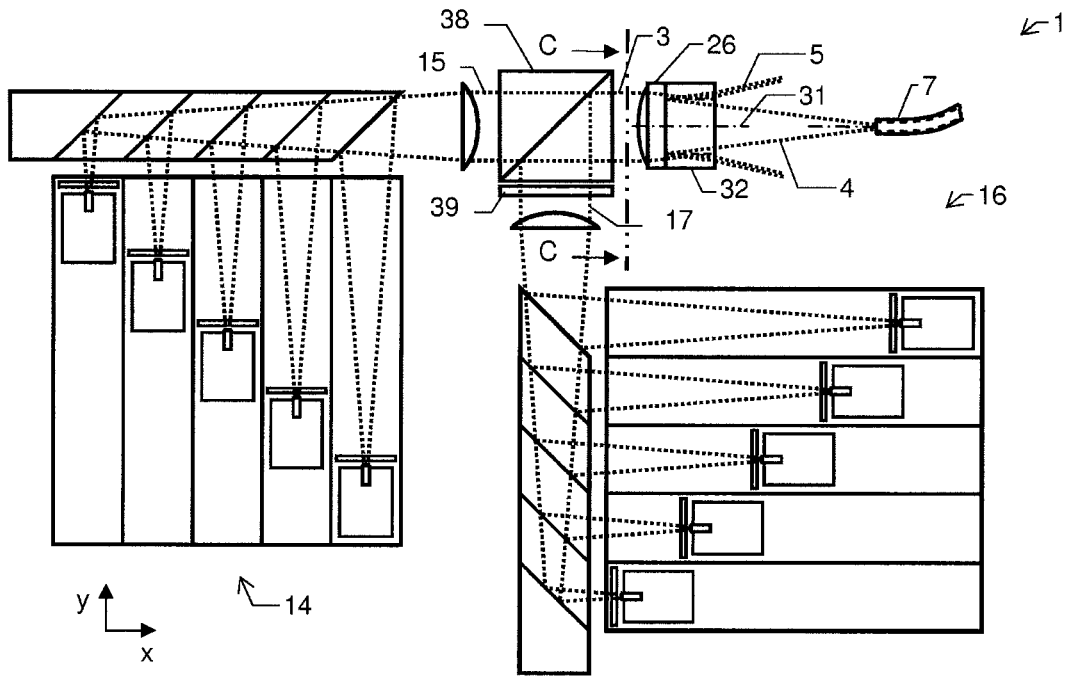
Figure 16:
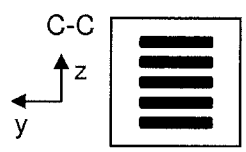
Figure 17:
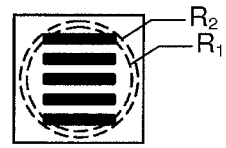
Figure 18:
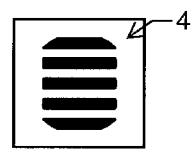
Figure 19:
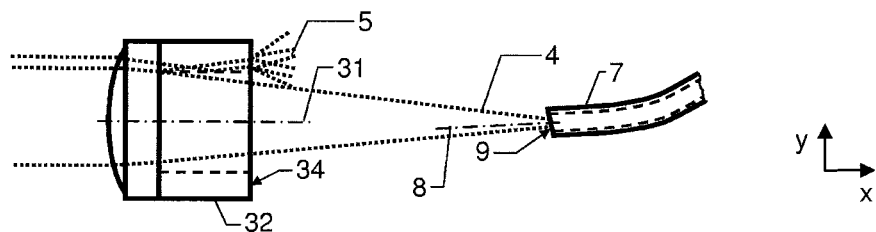

The figures show the following:

FIG. 1 shows the principle of action on the basis of a first exemplary embodiment FIG. 2 shows a first laser beam source according to the prior art FIG. 3 shows the first laser beam source according to the prior art FIG. 4 shows the beam profile of the first laser beam source FIG. 5 shows a second laser beam source according to the prior art FIG. 6 shows the beam profile of the second laser beam source FIG. 7 shows a second exemplary embodiment suboptimally adjusted FIG. 8 shows the second exemplary embodiment ideally adjusted FIG. 9 shows a third exemplary embodiment FIG. 10 shows the focus lens and the auxiliary tube of the second exemplary embodiment FIG. 11 shows the focus lens and the auxiliary tube of the second exemplary embodiment FIG. 12 shows details of a fourth exemplary embodiment FIG. 13 shows details of the fourth exemplary embodiment FIG. 14 shows details of the fourth exemplary embodiment without hatching FIG. 15 shows a fifth exemplary embodiment FIG. 16 shows the beam profile of the fifth exemplary embodiment FIG. 17 shows elucidations concerning the beam profile of the fifth exemplary embodiment FIG. 18 shows the useful light portion of the beam profile of the fifth exemplary embodiment FIG. 19 shows a sixth exemplary embodiment

EXEMPLARY EMBODIMENTS

FIG. 1 shows a first exemplary embodiment. The illustration shows a device 1 for coupling laser radiation 4 into an optical fiber 7, wherein the optical fiber has a coupling-in end having a fiber end face 9, comprising a laser beam source (not illustrated) which provides a collimated beam bundle 3, a focus lens 26, which has an effective aperture D, a focal length f, an optical axis and a fiber-side lens surface, wherein the focus lens focuses the collimated beam bundle 3 in the direction of the fiber end face 9 into a focus. A transparent auxiliary ring 32 having a ring inner diameter $d_R$ and a length $l_R$ is provided, wherein the auxiliary ring has an inner lateral surface 36, an outer lateral surface 35, a first end surface 33 and a second end surface 34, wherein the auxiliary ring 32 is arranged in the beam path downstream of the focus lens 26, and the inner lateral surface 36 is centered with respect to the optical axis (not depicted), and the first end surface 33 is arranged in a first plane situated at a distance s upstream of the focus 29, and the ring inner diameter $d_R$ is less than D·s/f and the length $l_R$ of the auxiliary ring is less than the distance s. Furthermore, a beam path is depicted. The rays come from the left-hand edge of the figure and run toward the right in the direction of the optical fiber 7. In this case, the rays are illustrated as randomly selected individual rays from the beam bundle. The auxiliary ring is embodied as a hollow cylinder composed of quartz glass and is arranged at a distance from the focus lens. Most of the rays from the beam bundle are focused onto the fiber end by the focus lens and can pass through the cavity surrounded by the auxiliary ring in an unimpeded manner. Some rays at the marginal region of the radiation field, said marginal region being situated at the bottom in the illustration, pass via the first end surface 33 into the auxiliary ring, i.e. into the glass body, where they impinge on the inner lateral surface 36 at a shallow angle and experience total internal reflection 6. In this case, they are reflected back into the auxiliary ring and acquire a direction component directed away from the optical axis. The non-useful radiation 5 emerging at the second end surface 34 then cannot pass to the optical fiber 7. A cubic polarization beam splitter 38 is also arranged in the collimated beam path. As a result, a second collimated beam bundle (not illustrated) can be superimposed with the first and be concomitantly coupled into the fiber.

FIG. 2 shows a plan view (xy) and FIG. 3 shows a side view (yz) of a laser beam source 14 according to the prior art, said laser beam source being described precisely in DE19780124. Five laser diodes 18, which are embodied as individual emitters, are mounted on a baseplate (heat sink) 19 and each emit laser radiation 2. The laser radiation is collimated with respect to the fast axis by a respective FAC lens 22. By means of a stepped mirror 24, the beam bundles of the individual emitters are rearranged to form a common beam bundle, which is collimated with respect to the slow axis by an SAC lens 25. In this way, the laser beam source can provide a collimated beam bundle 3. FIG. 4 schematically shows the known beam profile of this laser beam source in a plane A-A. The individual stripes stacked one above another as a result of the rearrangement are evident. While the emitters emit the laser radiation in the y-direction, the collimated beam bundle 3 of the laser beam source 14 is emitted in the x-direction. That is owing to the fact that in this case the beam rearrangement is accompanied by a direction change in the propagation direction. Two such laser beam sources are used in the fifth exemplary embodiment.

FIG. 5 shows a laser beam source 14 according to the prior art, which is described precisely in DE 102013006316 A1. A laser bar 18 is mounted on a heat sink 19 and provided with a cover 20. It has a plurality of emitters, which each emit a beam bundle of laser radiation. An FAC lens 22 embodied as a cylindrical lens serves for collimating the fast axis of the beam bundles of all the emitters. A beam rotating element 23 brings about a rearrangement of the beam bundles by virtue of each individual beam bundle being rotated by 90° about the propagation direction. The rearranged radiation field is collimated with respect to the slow axis by an SAC lens 25 embodied as a cylindrical lens. The beam propagation direction here is the x-direction.

FIG. 6 shows the known beam profile of the collimated laser beam bundle of the laser beam source from FIG. 5. The position of the sectional plane B-B is indicated in FIG. 7, described below.

FIG. 7 shows a second exemplary embodiment of a device 1 according to the invention. The above-described source according to the prior art DE 102013006316 A1, as shown in FIG. 5, is used as laser beam source 14. The device comprises an auxiliary ring 32 embodied as a hollow cylinder and having the length $l_R$, an inner diameter $d_R$ and a wall thickness w. The auxiliary ring can consist of glass, for example BK7. In a modification of the first exemplary embodiment, said auxiliary ring consists of quartz glass (silica). The auxiliary ring bears directly on the plane side of the focus lens 26, which is embodied as an aspherical rotationally symmetrical planoconvex converging lens. The focus lens 26 focuses the beam bundle of the useful radiation 4 into a focus 29 lying on the fiber end face 9. The distance between the first end surface of the auxiliary ring and the focus 29 has a value s, measured along the optical axis 31. The arrangement is suboptimally adjusted, that is to say that the center of the collimated beam bundle 3 of the laser beam source 14 is displaced in the y-direction relative to the optical axis 31 of the focus lens 26. As a result, part of the available laser radiation is deflected as non-useful radiation 5 by the auxiliary ring, such that it does not reach the fiber end face 9. Without the auxiliary ring, the non-useful radiation could reach the fiber end face at an excessively large angle and/or miss the fiber core, as a result of which damage or destruction of the fiber could occur. That is avoided by the use of the auxiliary ring 32 according to the invention.

FIG. 8 shows the second exemplary embodiment in the optimum adjustment state. The entire beam bundle is now focused as useful radiation 4 onto the fiber end face 9. The center of the collimated beam bundle 3 is aligned with respect to the optical axis 31 of the focus lens 26. The fiber end face 9 is a planar face that is perpendicular to the fiber axis 8. The fiber axis should be understood as a tangent of the center line of the fiber core at the point of intersection with the fiber end face. The fiber axis 8 is aligned with respect to the optical axis 31 of the focus lens 26. A focal plane 30 through the focus can be drawn perpendicular to the optical axis. The fiber end face 9 is situated in the focal plane 30 of the focus lens. The auxiliary ring 32 has no direct function in this adjustment state. However, if the adjustment state of the device 1 deteriorates, the auxiliary ring begins to function and deflects non-useful radiation, as shown in FIG. 7. In this respect, the auxiliary ring has a protective effect that allows the device to continue to be operated even if the adjustment state deteriorates. For increased operational reliability of the device, what is important, therefore, as shown in this exemplary embodiment, is not that the auxiliary ring is provided for regularly deflecting portions of the radiation. Rather, what is important only that the auxiliary ring is suitable for deflecting non-useful radiation if such radiation is coupled into the first end surface.

FIG. 9 shows a third exemplary embodiment. In this example, a beam bundle 15 of a first laser beam source (not illustrated) is combined with a second beam bundle 17 of a second laser beam source to form a common beam bundle 3 by means of a polarization beam splitter 38 before it is fed to the focus lens 26. The first beam bundle 15 is p-polarized with respect to the polarization beam splitter. The second beam bundle 17 is initially likewise p-polarized. However, the polarization direction is transformed into an s-polarization by means of a phase retardation element 39 before impinging on the polarization beam splitter. Therefore, the second beam bundle is reflected at the polarization beam splitter, while the first beam bundle is transmitted. In the example specified, the first beam bundle is not aligned exactly with respect to the optical axis 31 of the focus lens. Therefore, part of the laser radiation 5 is deflected by the auxiliary ring 32. The second beam bundle 17 is ideally aligned with respect to the optical axis 31, such that the entire second beam bundle can be coupled into the optical fiber 7 as useful radiation 4. If, for adjustment purposes, the first beam bundle 15 is then displaced in the −y-direction, the proportion of the deflected laser radiation 5 will decrease and the proportion of the useful radiation 4 will increase. By measuring the laser power in the optical fiber, it is thus possible for both beam bundles to be aligned exactly with respect to one another in a simple manner.

The optical fiber 7 of the third exemplary embodiment according to FIG. 9 has a fiber core 10, a fiber cladding 11 and a protective layer 12. The coupling-in end of the fiber additionally has an end cap 13 composed of quartz glass. The fiber end face 9, which in this case is the coupling-in surface of the end cap, is shifted upstream in the beam path relative to the focal plane 30 of the focus lens. The focus 29 here lies internally in the fiber. The power density of the laser radiation can be reduced by the enlarged fiber end face. Such an exemplary embodiment of the coupling-in end of the optical fiber is also combinable with all other exemplary embodiments.

FIG. 10 shows the focus lens 26 and the auxiliary ring 32 of the second and third exemplary embodiments before assembly in an enlarged sectional illustration. The auxiliary ring 32 is embodied as a hollow cylinder having the length $l_R$, the inner diameter $d_R$ and the wall thickness w. It has a first end surface 33, which in the geometrical sense represents the base surface of the hollow cylinder, and a second end surface, which in the geometrical sense represents the top surface of the hollow cylinder. Furthermore, the inner lateral surface 36 and the outer lateral surface 35 are indicated. The auxiliary ring can consist of glass, for example BK7. In a modification of the first exemplary embodiment, it consists of quartz glass (silica). The inner lateral surface and the first end surface have a common internal edge 37, embodied as a circle. The focus lens 26 is embodied as an aspherical rotationally symmetrical plano-convex converging lens having an effective aperture D. Moreover, it has a lens edge without an optical function. During assembly, the fiber-side lens surface 27 is placed onto the first end surface 33. The surfaces are connected by wringing in a first modification of the exemplary embodiment, and by a transparent adhesive layer in a second modification. Since the arrangement is rotationally symmetrical with respect to the optical axis 31, the illustration holds true both for an xy-section and for an xz-section.

FIG. 11 shows the focus lens 26 and the auxiliary ring 32 of the second and third exemplary embodiments after assembly. In the assembled state, the auxiliary ring bears directly on the plane fiber-side lens surface of the focus lens 26 or is connected thereto in the manner mentioned above.

FIG. 12 shows details of a fourth exemplary embodiment. Here the auxiliary ring 32 is secured together with the focus lens in a lens holder 40. A section EE is illustrated and explained below. In order to complete the fourth exemplary embodiment it is necessary, of course, also to add at least one laser beam source and an optical fiber.

FIG. 13 shows a sectional illustration of the details of the fourth exemplary embodiment. FIG. 14 shows the same illustration, with the hatching having been omitted for the sake of clarity. The focus lens 26 is embodied as a rotationally symmetrical biconvex achromatic lens having a focal length f. The effective aperture D is delimited here by the lens holder 40. The focus lens is secured together with the auxiliary ring 32 in the lens holder 40. An optically transparent adhesive 41 serves for securing, said adhesive being applied on the first end surface 33 and on parts of the outer lateral surface 35. The optical adhesive 41, which simultaneously serves as optical coupling material, brings about an optical coupling of the first end surface 33 to the fiber-side lens surface 27 of the focus lens. The joining gap is embodied in a wedge-shape fashion because the fiber-side lens surface 27 is convex and the first end surface 33 is plane. The first end surface 33 lies in a plane that is at a distance s from the focus 29. The distance can be measured along the optical axis 31. A ray is depicted which impinges on the focus lens at the distance $R_1$ from the optical axis 31. Said ray grazes the internal edge of the auxiliary ring and is thus a marginal ray of the useful beam bundle 4 which is focused into a focus 29 in the focal plane 30. A further ray at the distance $R_2$ from the optical axis is depicted. This ray is a marginal ray of the incident collimated beam bundle 3. The effective aperture D is chosen to be even greater than $R_2$ in order that no laser radiation impinges on the lens holder. All rays that impinge on the focus lens 26 at a distance between $R_1$ and $R_2$ from the optical axis are deflected as non-useful radiation 5 by the auxiliary ring by means of total internal reflection 6 at the inner lateral surface 36 and can leave the auxiliary ring through the second end surface 34. A first principal plane 28 of the focus lens can be used for a simplified consideration. The beam path for the useful radiation 4 can the are designed in a known manner by means of auxiliary lines 42, as is depicted schematically in FIG. 14, can be designed. The focal length f of the lens is then the distance between the focal plane 30 or the focus 29 and the first principal plane 28. As is readily apparent, the design of the beam path by means of the principal plane is possible only for the useful beam portion in this example. By way of example, if the refractive index of the auxiliary ring corresponds to that of the focus lens and a corresponding coupling material is used, no refraction occurs at the fiber-side lens surface for the non-useful radiation 5, such that the first principal plane cannot be used for the beam path of the non-useful rays. It should also be pointed out that the illustration of the two marginal rays should be understood to be schematic and serves only for elucidation. The marginal rays need not necessarily lie in the xz-plane; they can also lie in a different plane that can contain the optical axis.

FIG. 15 shows a fifth exemplary embodiment. In this example, a beam bundle 15 of a first laser beam source 14 is combined with a second beam bundle 17 of a second laser beam source 16 to form a common beam bundle 3 by means of a polarization beam splitter 38 before it is fed to the focus lens 26. The first beam bundle 15 is p-polarized with respect to the polarization beam splitter. The second beam bundle 17 is initially likewise p-polarized. However, the polarization direction is transformed into an s-polarization by means of a phase retardation element 39 before impinging on the polarization beam splitter. Therefore, the second beam bundle is reflected at the polarization beam splitter while the first beam bundle is transmitted. In the example specified, the first and second beam bundles are aligned with respect to one another and with respect to the optical axis 31 of the focus lens. The device 1 is designed such that part of the laser radiation 5 is regularly deflected by the auxiliary ring 32. The benefit of this measure is explained in the following figures.

FIG. 16 shows the beam profile of the collimated beam bundle of the fifth exemplary embodiment in a plane CC.

FIG. 17 shows, in addition to the beam profile, a circumcircle with the radius $R_2$ around the collimated beam bundle. $R_2$ is the maximum distance between the rays of the collimated beam bundle and the optical axis of the focus lens. Furthermore, a circle $R_1$ is depicted which encloses the maximum distance between the useful radiation and the optical axis of the focus lens. $R_1$ is thus the radius of the circumcircle of the useful radiation. Rays lying outside the circle $R_1$ are regularly deflected as non-useful radiation during the operation of the device of the fifth exemplary embodiment. As a result, the portions of the beam profile as shown in FIG. 18 are then coupled into the fiber as useful radiation 4. The proportion of the deflected radiation is relatively low. It can be for example 0.5% to 5% of the total power of the collimated beam bundle. By deflecting this small proportion of radiation, it is advantageously possible to achieve a smaller numerical aperture of the useful radiation 4 in comparison with the numerical aperture if the entire collimated beam bundle were coupled into the optical fiber.

FIG. 19 shows a sixth exemplary embodiment. Here the second end surface 34 of the auxiliary ring 32 is embodied in an unpolished fashion. As a result, the emerging non-useful radiation 5 is scattered. The optical fiber 7 has a fiber end face 9 that is not perpendicular to the fiber axis 8. In order to be able to couple the useful radiation 4 into the fiber with minimal numerical aperture, the fiber axis is arranged at an angle with respect to the optical axis of the focus lens. This measure makes it possible to avoid back-reflections of laser radiation to the laser beam source. The measures mentioned in the sixth exemplary embodiment can be combined—also individually—with all other exemplary embodiments.

The exemplary embodiments mentioned are combinable with one another in diverse ways in the context of the invention by the action of a person skilled in the art.

REFERENCE SIGNS

1. Device for coupling laser radiation into an optical fiber
2. Laser radiation
3. Collimated beam bundle
4. Useful radiation
5. Non-useful radiation
6. Total internal reflection
7. Optical fiber
8. Fiber axis
9. Fiber end face
10. Fiber core
11. Fiber cladding
12. Protective coating
13. Fiber end cap
14. Laser beam source, first laser beam source
15. Beam bundle of the first laser beam source
16. Second laser beam source
17. Beam bundle of the second laser beam source
18. Laser diode, laser bar
19. Heat sink, baseplate
20. Cover
21. Collimation device
22. FAC lens
23. Beam rotating element
24. Stepped mirror
25. SAC lens
26. Focus lens
27. Fiber-side lens surface
28. First principal plane
29. Focus
30. Focal plane
31. Optical axis
32. Auxiliary ring
33. First end surface
34. Second end surface
35. Outer lateral surface
36. Inner lateral surface
37. Internal edge
38. Polarization beam splitter
39. Phase retardation element
40. Focus lens holder
41. Coupling material
42. Auxiliary line for consideration of the beam path

The invention claimed is:

1. A device for coupling laser radiation into an optical fiber, wherein the optical fiber has a coupling-in end having a fiber end face, comprising a laser beam source which provides a collimated beam bundle, and a focus lens, which has an effective aperture D, a focal length f, an optical axis and a fiber-side lens surface, wherein the focus lens focuses the collimated beam bundle in the direction of the fiber end face into a focus, wherein a transparent auxiliary ring having a ring inner diameter $d_R$ and a length $l_R$ is provided, wherein the auxiliary ring has an inner lateral surface, an outer lateral surface, a first end surface and a second end surface, wherein the auxiliary ring is arranged in the beam path downstream of the focus lens, and the inner lateral surface is centered with respect to the optical axis (31), and the first end surface is arranged in a first plane situated at a distance s upstream of the focus, and the ring inner diameter $d_R$ is less than $D \cdot s/f$ and the length $l_R$ of the auxiliary ring is less than the distance s.

2. The device as claimed in claim 1, wherein the auxiliary ring is suitable for reflecting rays coming from the focus lens, said rays being coupled into the auxiliary ring at the first end surface, at the inner lateral surface by means of total internal reflection, wherein the reflected rays, after the reflection, propagate further in the auxiliary ring as far as the second end surface and arrive there with a direction component away from the optical axis.

3. The device as claimed in claim 1, wherein the first end surface bears directly on the fiber-side lens surface and/or is connected to the fiber-side lens surface by wringing.

4. The device as claimed in claim 1, wherein the first end surface is optically coupled to the fiber-side lens surface via a transparent coupling material.

5. The device as claimed in claim 1, wherein the device comprises a focus lens holder, and the auxiliary ring is connected to the focus lens holder via the first end surface and/or the outer lateral surface.

6. The device as claimed in claim 1, wherein the beam bundle of the laser beam source is linearly polarized in a first polarization direction, and the device additionally comprises a second laser beam source, which provides a second collimated beam bundle, which is linearly polarized in a second polarization direction, and the second laser beam bundle is combined with the first beam bundle by means of a beam splitter, such that the second beam bundle is coupled as it were with the first beam bundle into the optical fiber, wherein the beam splitter is arranged in the beam path upstream of the first end surface.

7. The device as claimed in claim 1, wherein the beam bundle of the laser beam source has a first wavelength, and the device additionally comprises a third laser beam source, which provides a third collimated beam bundle, which has a third wavelength, which is different than the first wavelength, and the third laser beam bundle is combined with the first beam bundle by means of a dichroic element, such that the third beam bundle is coupled as it were with the first beam bundle into the optical fiber, wherein the dichroic element is arranged in the beam path upstream of the first end surface.

8. The device as claimed in claim 1, wherein the device has a housing, and the coupling-in end of the optical fiber is connected to the housing, and the focus lens is adjustable relative to the fiber end face.

9. The device as claimed in claim 1, wherein the optical fiber has a first numerical aperture $NA_F$, and the laser radiation is guided in the optical fiber, and the laser radiation has a second numerical aperture $NA_L$, and the second numerical aperture $NA_L$ is less than the first numerical aperture $NA_F$.

10. The device as claimed in claim 1, wherein the length $Z_R$ of the auxiliary ring is between one tenth and two thirds of the focal length f of the focus lens, and/or in that the auxiliary ring has a wall thickness w, and the wall thickness w is greater than one tenth of the ring inner diameter $d_R$.

11. The device as claimed in claim 1, wherein the outer lateral surface and/or the second end surface are/is embodied and/or coated as light-scattering and/or absorbing surfaces.

12. The use of a transparent auxiliary ring having a ring inner diameter $d_R$ and a length $l_R$, which auxiliary ring has an inner lateral surface, an outer lateral surface, a first end surface and a second end surface and is suitable for reflecting non-useful light, coupled in at the first end surface, at the inner lateral surface by means of total internal reflection and for coupling out and/or scattering and/or absorbing said light at the second end surface and/or the outer lateral surface, for adjusting and/or for operating and/or for protecting a device for coupling laser radiation into an optical fiber, wherein the device comprises a focus lens having an effective aperture D and a focal length f, wherein the focus lens focuses the laser radiation in the direction of the fiber end face into a focus, wherein the first end surface is arranged in a first plane situated at a distance s upstream of the focus, and the ring inner diameter $d_R$ is less than D·s/f, and the inner lateral surface is centered with respect to the optical axis, and the length $l_R$ of the auxiliary ring is less than the distance s.

13. A method for coupling laser radiation into an optical fiber, wherein the optical fiber has a coupling-in end having a fiber end face, comprising
  a) providing at least one collimated beam bundle,
  b) focusing the collimated beam bundle into a focus by means of a focus lens,
  c) coupling the focused beam bundle into the optical fiber,
  wherein the focus lens has an effective aperture D, a focal length f, an optical axis and a fiber-side lens surface,
  wherein a transparent auxiliary ring having a ring inner diameter $d_R$ and a length $l_R$ is provided, wherein the auxiliary ring has an inner lateral surface, an outer lateral surface, a first end surface and a second end surface, wherein the auxiliary ring is arranged in the beam path downstream of the focus lens, and
  the first end surface is arranged in a first plane situated at a distance s upstream of the focus, and
  the ring inner diameter $d_R$ is less than D·s/f, and
  the inner lateral surface is centered with respect to the optical axis, and
  the length $l_R$ of the auxiliary ring is less than the distance s,
  wherein the auxiliary ring is suitable for reflecting rays, coupled in at the first end surface, at the inner lateral surface by means of total internal reflection and for coupling out and/or scattering and/or absorbing said rays at the second end surface and/or the outer lateral surface.

* * * * *